Feb. 23, 1954   C. B. REYNOLDS   2,670,063
PARKING BRAKE
Filed March 26, 1952

INVENTOR.
Charles B. Reynolds.
BY
Wilfred E. Lawson
ATTORNEY.

Patented Feb. 23, 1954

2,670,063

UNITED STATES PATENT OFFICE 2,670,063

PARKING BRAKE

Charles B. Reynolds, Orange, Calif.

Application March 26, 1952, Serial No. 278,644

1 Claim. (Cl. 192—3)

This invention relates generally to motor vehicles and is directed particularly to improvements therein pertaining to the vehicles' brakes.

An object of the present invention is to provide, in a manner as hereinafter set forth, a mechanism associated with the service brake of a motor vehicle whereby such service brake will be automatically applied and held in such position under prescribed conditions when the vehicle is at rest.

A further and more specific object of the invention is to provide a mechanism designed to be associated with the service brake of a motor vehicle, by means of which such service brake will be automatically applied and held applied upon and following the turning off of the ignition whereby the motor vehicle engine is caused to stop.

A still further object of the invention is to provide, in a manner as hereinafter set forth, a fluid operated piston operatively coupled with the motor vehicle service brake with a valve controlled means for conducting fluid under pressure to said piston, whereby the application of the pressure fluid to the piston will effect the application of the service brake.

A still further object of the invention is to provide, in the manner as hereinafter set forth, mechanism of the above described character wherein the transmission of the fluid under pressure to the brake pedal operating piston becomes automatic with the turning off of the ignition switch of the engine.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

Figure 1:
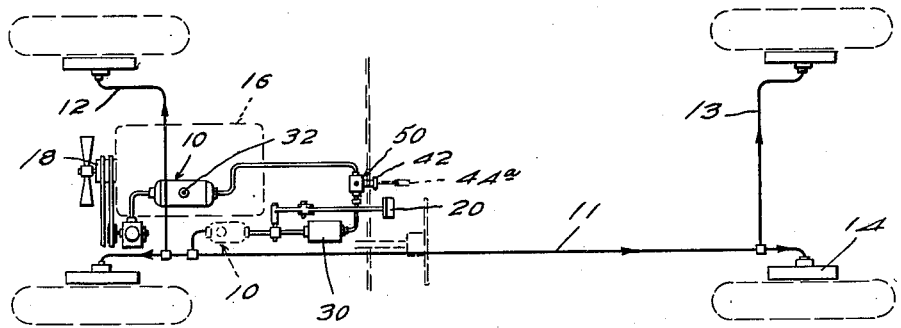
Figure 1 is a diagrammatic view illustrating the lay-out of the brake system of a motor vehicle and showing in association therewith the mechanism constituting the present invention.

Referring now more particularly to the drawing there are illustrated in Figure 1 diagrammatically conventional parts of a motor vehicle brake system with which the present invention is associated, wherein the numeral 10 generally designates the master cylinder which is operatively connected with the brake fluid lines 11, 12 and 13, the lines 12 and 13 leading from the main line 11 to the conventional brakes 14 of the vehicle.

The numeral 16 designates the vehicle engine, shown in broken lines and the numeral 18 designates the fan pulley.

Figure 2:
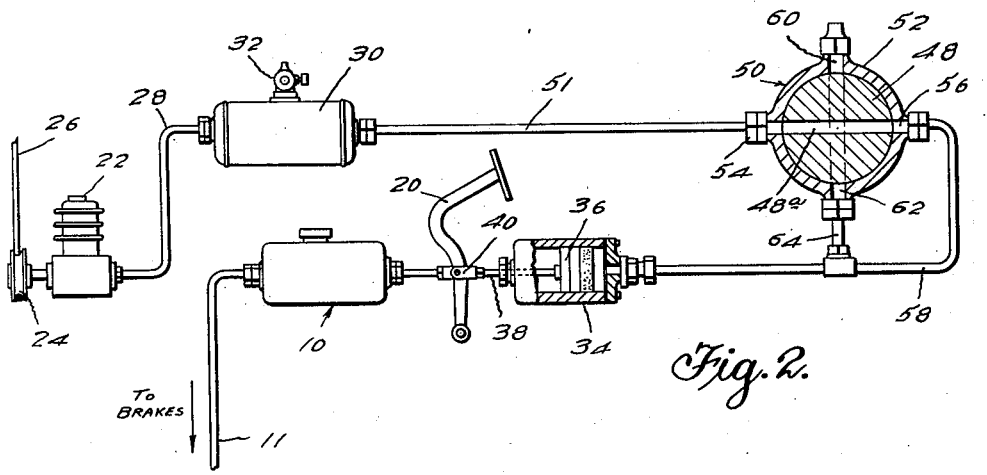
Figure 2 is a diagrammatic view of the mechanism per se, parts being in section and certain parts being on an exaggerated enlarged scale.
Figure 3:
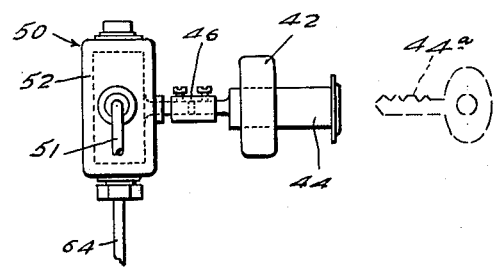
Figure 3 is a detailed view illustrating the connection between the fluid line control valve and the vehicle ignition switch unit.

Referring now more particularly to Figure 2 the main elements of the present invention are illustrated in association with the master cylinder 10 and the service brake 20.

In accordance with the present invention there is provided a suitable air compressor 22 which may be operatively coupled with the fan belt pulley 18 through the medium of the pulley 24 and belt 26, the latter being trained around the fan belt pulley. Leading from the compressor is the fluid line 28 by which air under pressure is conveyed to a suitable tank 30 having a pressure relief valve 32 by means of which the pressure within the tank may be maintained within safe bounds.

Associated with the brake pedal 20 is a fluid cylinder 34 in which is the fluid operated piston 36 having a rod 38 passing from an end of the cylinder to and coupled with the brake pedal 20 by suitable means such as the clevis 40. The operating piston 36 is rearwardly of the brake pedal 20 so that when the piston is forced forwardly in the cylinder it will move the brake pedal to brake applying position, forcing fluid from the master cylinder 10 into the fluid line 11 for the purpose of applying brakes 14 of the vehicle.

The numeral 42 designates a conventional key operated ignition switch. No details of the construction of the ignition switch are shown since the same is of well known standard form.

Operatively coupled with the ignition switch lock 44, as indicated at 46, is the rotary element 48 of a two-way valve which is generally designated 50, the rotary element being mounted within a suitable housing 52.

The rotary element 48 has a single through passage 48a which, when in one position establishes a direct communication between a pipe 51 leading from the pressure tank 30 to an inlet 54 of the valve 50, and the outlet 56 of the valve which is connected with one end of the conduit 58, the other end of which is connected with the piston cylinder 34 and communicates with the interior thereof upon the side of the piston 36 opposite from the piston rod or stem 38.

The shell 52 or housing of the valve 50 has the two additional ports 60 and 62 which are in line diametrically of the valve shell and at right angles to the line of communication between the ports 54 and 56. The port 62 is connected by the pipe 64 with the conduit 58 while the port 60 opens to the atmosphere.

It is believed from the foregoing that the operation of the present invention will be readily apparent. When the ignition key 44a is introduced into the lock 44 and turned for the purpose of turning on the ignition system of the motor vehicle the valve element 48 will be rotated so as to establish communication between the ports 40 and 62. Thus the line leading from the tank 30 to the cylinder 34 will be closed and fluid under pressure in the cylinder 34 will be permitted to reverse flow to the pipe 64 through which it will pass to the exhaust port 60 to the atmosphere. This will permit the foot brake 20 to return to its normal brake released position.

When the engine is operated the pump 22 will build up pressure in the tank 30 and when the vehicle is stopped and the ignition key turned to shut off the ignition the valve element 48 will be turned to the position shown in full lines in Figure 2 thus permitting fluid under pressure to pass through the pipes or conduits 51 and 58 into the cylinder 34 and force the piston 36 forwardly to shift the foot brake to brake applied position.

From the foregoing it will be readily apparent that when a motor vehicle is equipped with the present invention there will be no danger of the driver of the vehicle leaving the machine without applying a brake to hold it against accidental movement. It frequently happens that a motor vehicle operator will leave his machine without applying the hand brake or after only imperfectly applying it, as a result of which the machine, if parked on a hill, may coast down the hill and cause considerable damage. With the present invention as soon as the ignition key is turned to stop the engine the fluid under pressure in the tank 30 will take control of the brake system and apply and hold the brakes applied until the ignition key is again inserted and turned to the position necessary for the starting of the engine whereupon the fluid holding the brakes applied will be exhausted and the brakes will be released.

I claim:

In a braking system for motor vehicles, including the service brake pedal of the vehicle and the master brake cylinder having its piston connected to and forwardly thereof, a fluid pressure cylinder having its piston connected to and rearwardly of said pedal whereby movement of the latter piston in the forward direction actuates the pedal into brake applying position, an air compressor having operative connection with the vehicle engine, a tank supplied with compressed air from said compressor, a conduit connecting said tank with the second named cylinder for actuating the piston thereof, a two way rotary valve in said conduit for controlling the application of the fluid pressure to and its exhaust from the latter cylinder, said valve having an operating stem, and a coupling between said stem and the ignition switch of the vehicle, whereby the valve is turned to its "on" and "off" positions correspondingly with the turning of said switch to the reversed positions thereof.

CHARLES B. REYNOLDS.

References Cited in the file of this patent

UNITED STATES PATENTS

| Number | Name | Date |
|---|---|---|
| 1,710,128 | Welch | Apr. 23, 1929 |
| 1,793,597 | Down | Feb. 24, 1931 |
| 2,328,684 | Schnell | Sept. 7, 1943 |